(12) United States Patent
Jeanson et al.

(10) Patent No.: US 9,163,589 B2
(45) Date of Patent: Oct. 20, 2015

(54) VALVE SEAT AND GASKET FOR EXHAUST GAS BYPASS FOR TURBOCHARGER

(71) Applicant: Honeywell International Inc., Morristown, NJ (US)

(72) Inventors: Arthur Jeanson, Thaon les Vosges (FR); Jean-Luc Perrin, Girmont (FR); Jean-Yves Bodin, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 42 days.

(21) Appl. No.: 13/905,445

(22) Filed: May 30, 2013

(65) Prior Publication Data

US 2014/0353538 A1    Dec. 4, 2014

(51) Int. Cl.
| | | |
|---|---|---|
| *F02D 23/00* | (2006.01) |
| *F02B 33/44* | (2006.01) |
| *F16K 25/00* | (2006.01) |
| *F16K 1/16* | (2006.01) |
| *F16K 1/00* | (2006.01) |
| *F16K 1/226* | (2006.01) |
| *F16K 21/04* | (2006.01) |
| *F16J 15/32* | (2006.01) |
| *F16L 23/00* | (2006.01) |
| *F02M 25/07* | (2006.01) |
| *F02B 37/00* | (2006.01) |
| *F02B 37/013* | (2006.01) |
| *F02B 37/18* | (2006.01) |

(Continued)

(52) U.S. Cl.
CPC .......... *F02M 25/0787* (2013.01); *F02B 37/004* (2013.01); *F02B 37/013* (2013.01); *F02B 37/183* (2013.01); *F16L 17/035* (2013.01); *F16L 23/04* (2013.01); *Y02T 10/144* (2013.01)

(58) Field of Classification Search
CPC .... F02B 37/004; F02B 37/183; F02B 37/013; F16L 17/035; F16L 23/00; F16L 23/04; F16J 15/02; F16J 15/06; F01N 13/08; F01N 13/18
USPC ........... 60/602; 251/171, 173–174, 301, 332, 251/337, 298; 137/543.13, 527; 277/555
See application file for complete search history.

(56) References Cited

U.S. PATENT DOCUMENTS

| | | |
|---|---|---|
| 1,917,000 A | 7/1933 | Emil |
| 2,532,067 A | 11/1950 | La Bour |

(Continued)

FOREIGN PATENT DOCUMENTS

| | | | |
|---|---|---|---|
| CN | 101943270 A * | 1/2011 | ............. F16K 1/226 |
| DE | 4225516 A1 | 2/1994 | |

(Continued)

OTHER PUBLICATIONS

Extended European Search Report (EESR) of Nov. 25, 2014 for European Patent Application No. EP 14 167 963.9 (11 pages).

(Continued)

*Primary Examiner* — Thai Ba Trieu
(74) *Attorney, Agent, or Firm* — Brian J. Pangrle (57) ABSTRACT

An assembly can include a valve seat for an exhaust bypass valve of a serial turbocharger system; and a gasket that includes a planar portion that defines a perimeter and that includes a tab that extends from the perimeter of the planar portion for engagement with the valve seat to secure the gasket to the valve seat. Various other examples of devices, assemblies, systems, methods, etc., are also disclosed.

20 Claims, 11 Drawing Sheets

(51) Int. Cl.
*F16L 17/035* (2006.01)
*F16L 23/04* (2006.01)

(56) References Cited

U.S. PATENT DOCUMENTS

| | | | |
|---|---|---|---|
| 3,044,683 A | | 7/1962 | Woollenweber, Jr. |
| 3,077,332 A | * | 2/1963 | Burtis ............... 251/174 |
| 3,114,561 A | * | 12/1963 | Creath et al. ............ 277/555 |
| 3,334,858 A | | 8/1967 | Hay |
| 3,494,589 A | | 2/1970 | Mumma |
| 4,073,473 A | | 2/1978 | Rihm |
| 4,304,255 A | | 12/1981 | Prince |
| 4,427,025 A | | 1/1984 | Prince |
| 4,653,725 A | * | 3/1987 | Nanz et al. ............ 251/301 |
| 4,730,456 A | | 3/1988 | Tadokoro et al. |
| 4,848,729 A | * | 7/1989 | Danzy ................ 251/332 |
| 5,215,117 A | | 6/1993 | Petersen et al. |
| 6,152,171 A | * | 11/2000 | Messick et al. ......... 137/543.13 |
| 6,279,875 B1 | * | 8/2001 | Chatufale ............ 251/174 |
| 7,004,452 B2 | * | 2/2006 | Chatufale ............ 251/171 |
| 8,109,257 B2 | | 2/2012 | An et al. |
| 8,667,794 B2 | | 3/2014 | Perrin et al. |
| 2007/0169479 A1 | | 7/2007 | Nicolle et al. |
| 2009/0014674 A1 | | 1/2009 | Grissom |
| 2010/0187460 A1 | | 7/2010 | An et al. |
| 2011/0049813 A1 | | 3/2011 | Han |
| 2012/0304952 A1 | | 12/2012 | Perrin |
| 2012/0317975 A1 | * | 12/2012 | Schoenherr et al. ........... 60/602 |
| 2013/0291538 A1 | * | 11/2013 | Grossmann ................. 60/602 |

FOREIGN PATENT DOCUMENTS

| | | | | |
|---|---|---|---|---|
| DE | 19516375 A1 | | 11/1996 | |
| DE | 29818551 U1 | * | 2/1999 | ............ F16K 1/46 |
| DE | 10149287 A1 | | 4/2003 | |
| DE | 102008038052 A1 | | 2/2010 | |
| DE | 102009058411 A1 | * | 6/2011 | ............ F02C 6/12 |
| EP | 1843019 A1 | | 10/2007 | |
| EP | 1626169 B1 | | 2/2008 | |
| EP | 1843019 B1 | | 9/2010 | |
| EP | 2530275 A2 | | 12/2012 | |
| FR | 2848279 A1 | | 6/2004 | |
| FR | 2921421 A1 | | 3/2009 | |
| JP | 57-029875 A | | 2/1982 | |
| JP | 10026235 A | * | 1/1998 | ............ F16K 1/226 |
| JP | H11 94088 A | | 4/1999 | |
| JP | 2003-049948 A | | 2/2003 | |
| JP | 2005-290529 A | | 10/2005 | |
| WO | 2007103860 A2 | | 9/2007 | |
| WO | 2012102854 A2 | | 8/2012 | |

OTHER PUBLICATIONS

EP Application No. 12168142.3-1603 / 2530275: European Search Report Feb. 25, 2013 (4 pages).

* cited by examiner

VALVE SEAT AND GASKET FOR EXHAUST GAS BYPASS FOR TURBOCHARGER

TECHNICAL FIELD

Subject matter disclosed herein relates generally to turbomachinery for internal combustion engines and, in particular, to seal mechanisms for exhaust bypass valves.

BACKGROUND

An exhaust bypass valve is often used to control operation of serial turbocharger systems. Such a valve may be operated to physically divert exhaust or alter pressures in exhaust pathways, for example, to direct exhaust flow partially or fully to one of multiple turbines in a system. During operation, a typical exhaust bypass valve experiences high exhaust pressure on one side and lower pressure on the other side. To effectively seal the high pressure environment from the low pressure environment, considerable force is required to maintain contact between a valve and a valve seat. In a sealed state of a valve and valve seat, pressure differentials may challenge one or more inter-component seals and result in detrimental exhaust leakage. Various technologies described herein have potential to reduce cost as well as provide for effective exhaust bypass valve sealing.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
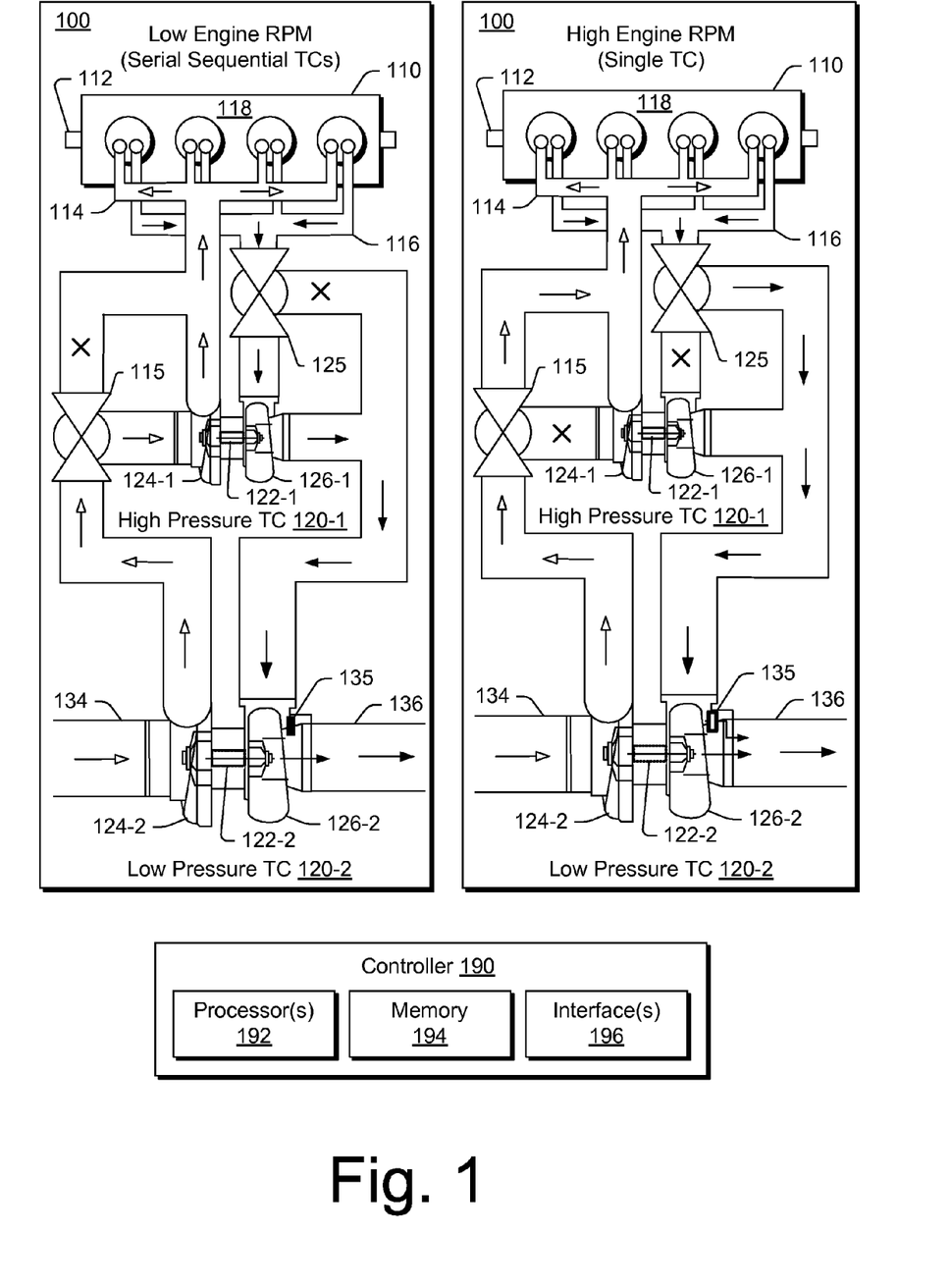
FIG. 1 is a diagram of an example of a system that includes turbochargers and an internal combustion engine along with a controller.

Turbochargers are frequently utilized to increase output of an internal combustion engine. FIG. 1 shows a system 100 in two operational configurations (low engine RPM and high engine RPM) where the system 100 includes an internal combustion engine 110 and turbochargers 120-1 and 120-2 in a serial sequential arrangement.

The internal combustion engine 110 includes an engine block 118 housing one or more combustion chambers that operatively drive a shaft 112 (e.g., via pistons) where rotation of the shaft 112 determines, for example, engine revolutions per minute (RPM). As shown in FIG. 1, an intake manifold 114 provides a flow path for air to the engine block 118 while an exhaust manifold 116 provides a flow path for exhaust from the engine block 118.

Each of the turbochargers 120-1 and 120-2 can act to extract energy from the exhaust and to provide energy to intake air, which may be combined with fuel to form combustion gas. As shown in FIG. 1, each of the turbochargers 120-1 and 120-2 includes a shaft 122-1 and 122-2, a compressor 124-1 and 124-2, and a turbine 126-1 and 126-2. Each of the turbochargers 120-1 and 120-2 may include a housing, which may be referred to as a center housing (e.g., disposed between a respective compressor and turbine). As an example, a turbocharger shaft may be a shaft assembly that includes a variety of components.

As to fluid flow to and from the serial sequential arrangement of turbochargers 120-1 and 120-2, an air intake 134 receives inlet air, which is directed to the compressor 124-2 and an exhaust outlet 136 receives exhaust from the turbine 126-2, which may include an exhaust wastegate valve 135. The wastegate valve 135 can be controlled to allow exhaust to bypass the turbine 126-2.

In the low engine RPM operational state, the turbochargers 120-1 and 120-2 are operated in series, sequentially. Specifically, exhaust from the exhaust manifold 116 is directed first to the turbine 126-1, which causes rotation of the compressor 124-1, and then to the turbine 126-2, which causes rotation of the compressor 124-2. As the turbine 126-1 extracts energy from the exhaust, the exhaust pressure decreases while the compressor 124-1 increases boost pressure (e.g., pressure differential between its inlet and outlet). In the example system 100, based on compressor inlet pressure, the turbocharger 120-1 is referred to as a high pressure turbocharger while the turbocharger 120-2 is referred to as a low pressure turbocharger for the serial sequential operational state. As indicated in FIG. 1, compressed intake air from the compressor 124-2 (e.g., receiving air at atmospheric conditions) is compressed and directed to an inlet of the compressor 124-1 (e.g., receiving the compressed air, which is at a pressure greater than atmospheric). Such an arrangement may be referred to as dual-stage compression.

In the low engine RPM operational state, an air valve 115 may be configured in an orientation that directs compressed air from the compressor 124-2 to the inlet of the compressor 124-1 and an exhaust valve 125 may be configured in an orientation that directs exhaust from the manifold 116 to the turbine 126-1. During operation, either or both of the valves 115 and 125 may be regulated. For example, the valve 115 may be regulated such that at least some intake air bypasses the compressor 124-1 and the valve 125 may be regulated such that at least some exhaust bypasses the turbine 126-1. Such regulation may occur while the system 100 is maintained in a serial sequential operational state. In contrast, when the air valve 115 is configured in an orientation that causes full or substantial bypass of the compressor 124-1 and when the exhaust valve is configured in an orientation that causes full or substantial bypass of the turbine 126-1, the system 100 operates fully or essentially as a single turbocharger system. Such an operational state is typically selected for high engine RPM.

As the high engine RPM operational state relies on the turbocharger 120-2 and as high engine RPM logically follows low engine RPM, regulation of the exhaust valve 125 can act to pilot the low pressure turbocharger 120-2. For example, when a preset engine RPM or boost pressure is reached, a controller may actuate the exhaust valve 125 to increase flow of exhaust to the turbine 126-2 (e.g., via physical diversion or pressure differential). In such a scenario, the increased flow to the turbine 126-2 increases rotational speed of the shaft 122-2, which prepares the turbocharger 120-2 for a more rapid response and power output (e.g., with minimum turbo lag) upon configuration of the exhaust valve 125 in an orientation that causes full or significant bypass of the turbine 126-1.

The system 100 may also include other features, for example, a heat exchanger (e.g., or heat exchangers) may be positioned to cool compressed intake air prior to delivery of the compressed air to the combustion chambers of the engine 110. As an example, a heat exchanger may include a water-cooled compressor housing. As described herein, the system 100 may include one or more exhaust gas recirculation paths that can circulate exhaust to intake air; noting that exhaust valves and intake valves for combustion chambers of the engine 110 may be appropriately controlled to achieve some degree of exhaust "recirculation" (e.g., retention in a chamber).

In FIG. 1, an example of a controller 190 is shown as including one or more processors 192, memory 194 and one or more interfaces 196. Such a controller may include circuitry such as circuitry of an engine control unit. Such a controller may include circuitry that provides for reading, writing or reading and writing information (e.g., executable instructions, control instructions, data, etc.) to memory (e.g., a computer-readable storage medium). As described herein, various methods or techniques may optionally be implemented in conjunction with a controller, for example, through control logic. Control logic may depend on one or more engine operating conditions. For example, sensors may transmit information to the controller 190 via the one or more interfaces 196. Control logic may rely on such information and, in turn, the controller 190 may output control signals to control engine operation. The controller 190 may be configured to control an air valve (see, e.g., the air valve 115), an exhaust valve (see, e.g., the exhaust valve 125), a variable geometry assembly, a wastegate (see, e.g., the wastegate 135), an electric motor, or one or more other components associated with an engine, an exhaust turbine (or exhaust turbines), a turbocharger (or turbochargers), etc. With respect to valves, the controller 190 may be configured to act as an actuator or to transmit a signal to an actuator configured to actuate, for example, the air valve 115, the exhaust valve 125, the wastegate valve 135 (e.g., to close or open a wastegate), etc.

Figure 2:
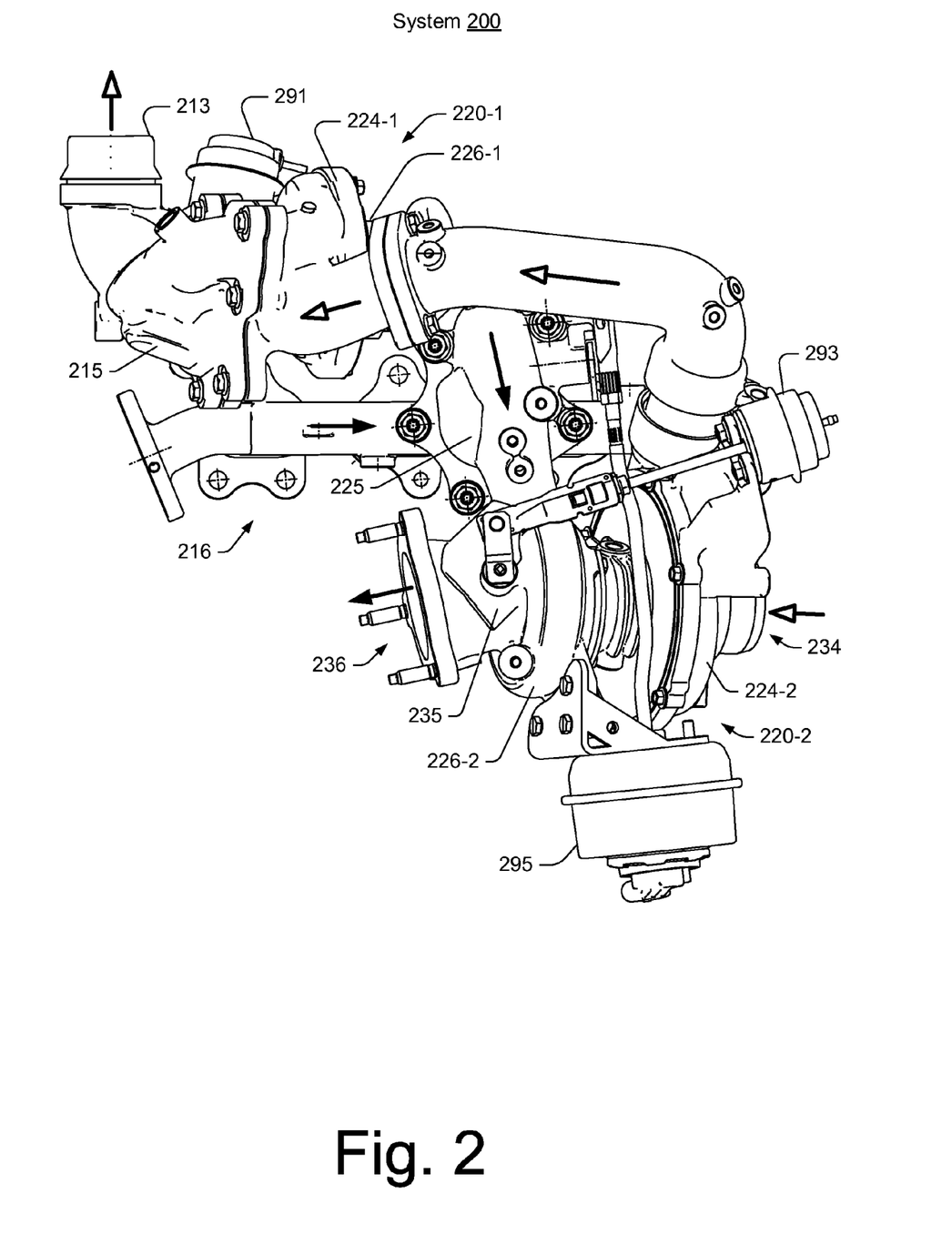
FIG. 2 is a perspective view of an example of a serial sequential turbocharger system.
Figure 3:
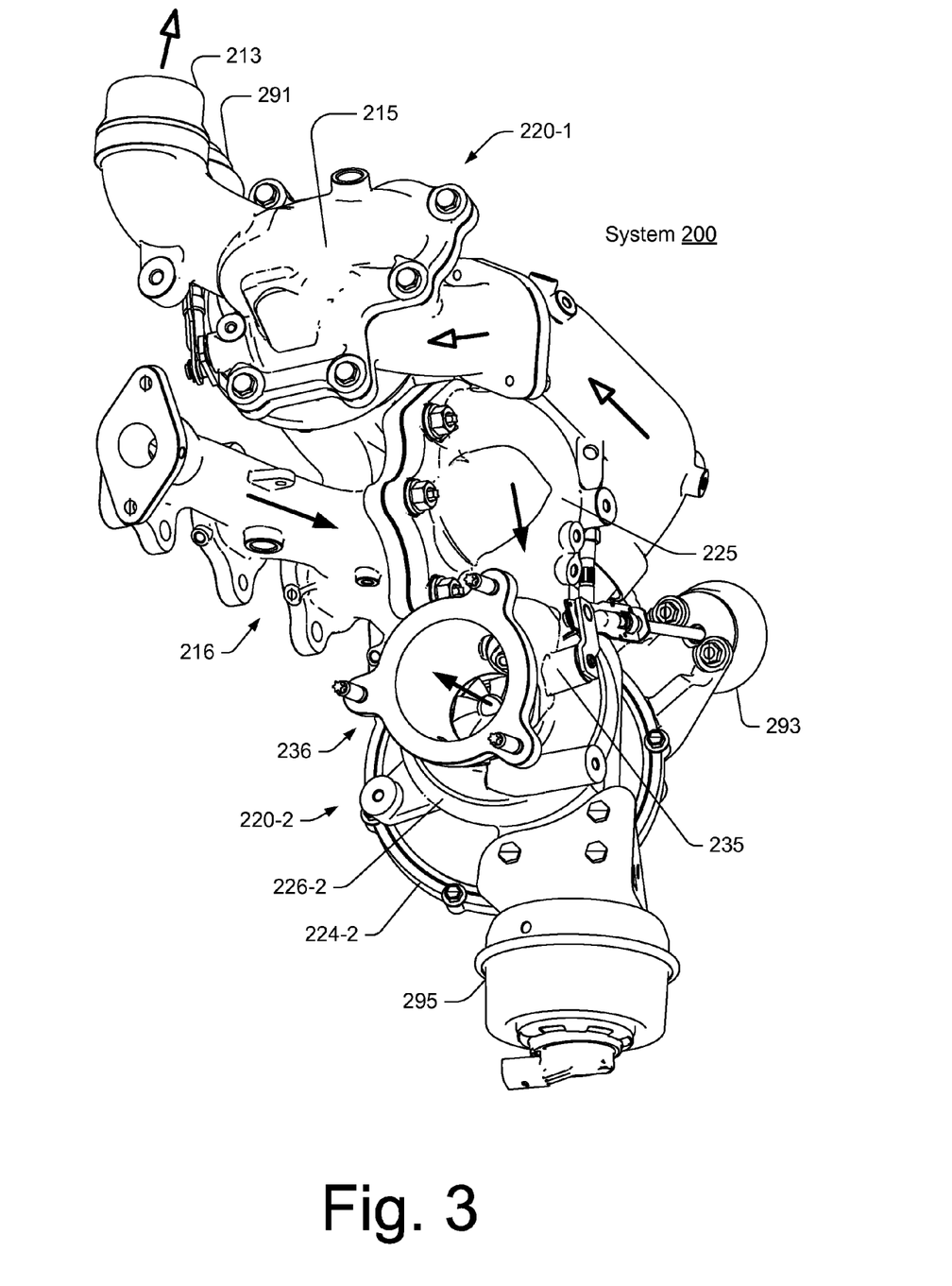
FIG. 3 is another perspective view of the serial sequential turbocharger system of FIG. 2.

FIGS. 2 and 3 show perspective views of a system 200 with two turbochargers 220-1 and 220-2 along with an air outlet 213, an air valve 215, an exhaust manifold 216, an exhaust valve 225, a wastegate 235, an air intake 234, an exhaust outlet 236, an air valve actuator 291, a wastegate actuator 293 and an exhaust valve actuator 295. Open headed arrows indicate intended air flow directions while solid headed arrows indicate intended exhaust flow directions. Each of the turbochargers 220-1 and 220-2 includes a compressor 224-1 and 224-2 and a turbine 226-1 and 226-2.

As described herein, a system capable of serial sequential turbocharger operation and single turbocharger operation may be arranged in any of a variety of manners. For example, an exhaust valve may be located in a variety of positions depending on number, shape and size of exhaust conduits. In general, an exhaust valve acts to cause flow of exhaust predominantly to a larger of the turbochargers, which is often referred to as a low pressure turbocharger in a serial sequential arrangement. As mentioned, an exhaust valve may act to physically bypass a smaller, high pressure turbocharger or it may act to alter pressure in pathways. As to the latter, with reference to the system 200, the exhaust valve 225 may be located adjacent the exhaust manifold 216 such that upon opening of the valve 225, exhaust flows along a lower pressure pathway to the larger turbine 226-2 of the low pressure turbocharger 220-2. In such an arrangement, the exhaust valve 225 can regulate exhaust flow form a high pressure source (e.g., manifold) to a lower pressure pathway.

As described herein, exhaust valve regulation may occur such that an exhaust valve is closed, open or in any intermediate state. In general, an exhaust valve opens in a direction facilitated by a pressure differential and closes in a direction opposed to the pressure differential. Such a valve arrangement provides for easier opening (e.g., less actuator force to open) and, upon failure of an actuator, the valve being in an open or partially open state (e.g., which allows flow of exhaust to the larger turbine). If an exhaust valve were arranged such that actuator failure prevented opening, then, at high engine RPM, exhaust would be first directed to the smaller turbine, which could cause overspeed and potential failure of the smaller turbine (or compressor). Ultimately, however, an exhaust valve should be capable of effectively closing an exhaust opening (e.g., overcoming pressure differentials) such that, for low engine RPM, exhaust is directed to the smaller turbine.

Figure 4:
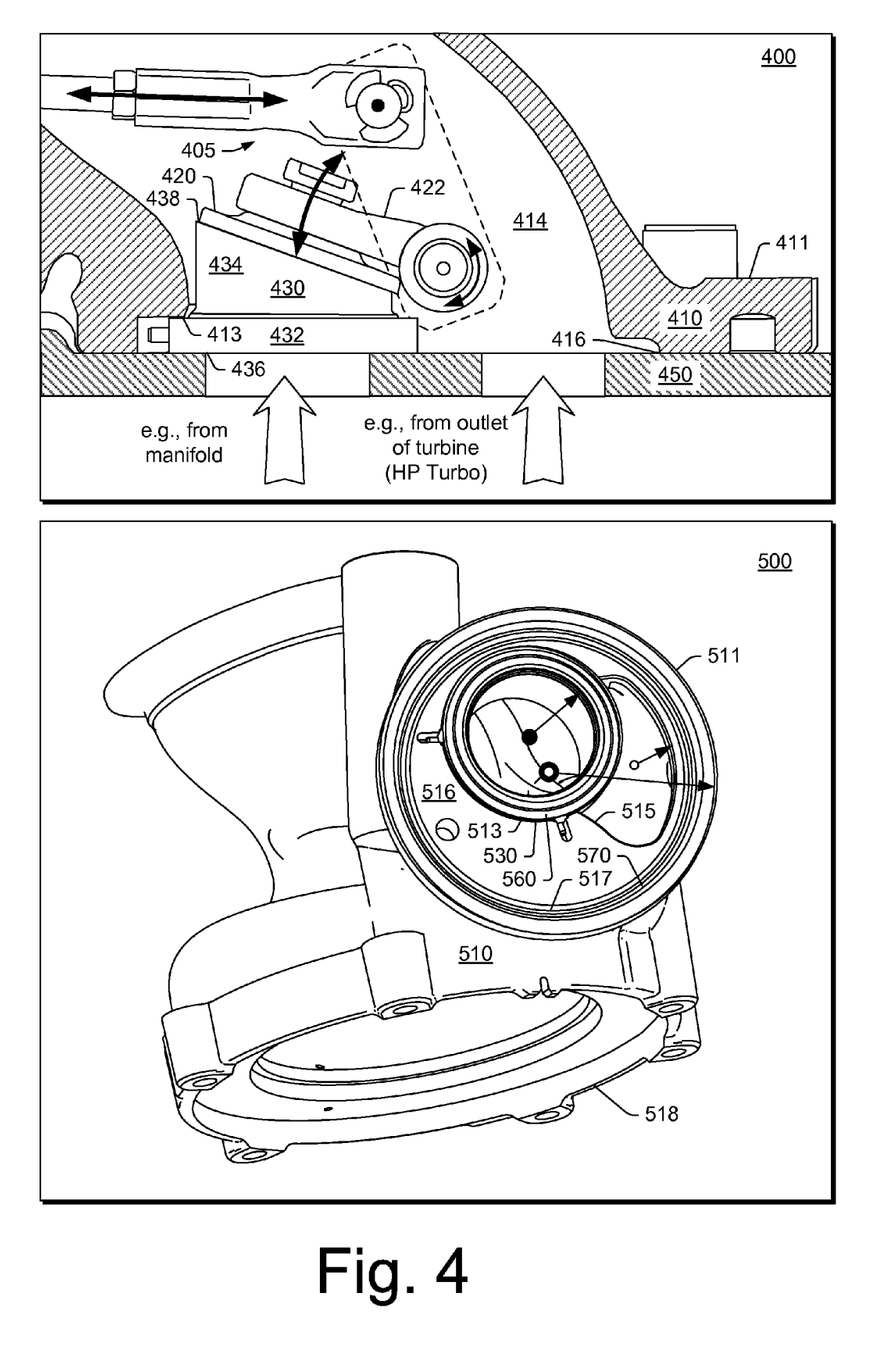
FIG. 4 is a cross-sectional view of an example of an exhaust bypass valve assembly and a perspective view of an example of an exhaust bypass valve assembly.

FIG. 4 shows an example of an exhaust valve assembly 400 that may receive exhaust, for example, from a manifold and from an outlet of a turbine of a high pressure turbocharger (see, e.g., FIGS. 1, 2 and 3). For example, the assembly 400 includes a housing 410 with an exhaust inlet flange 411 configured to be operatively coupled to another component (e.g., or components) for receipt of exhaust. As shown in FIG. 4, the housing 410 defines a chamber 414 configured for receipt of exhaust, in part, responsive to position of a poppet 420, which is attached to and movable by an arm 422, where the arm 422 may be attached to or linked to an actuator (see, e.g., actuator assembly 405). As described herein, a poppet can act as a plug, for example, to plug or seal an opening (e.g., to plug or seal an opening to an exhaust manifold coupled to an internal combustion engine).

In the example of FIG. 4, the assembly 400 includes a valve seat 430 disposed between the housing 410 and another component 450, which may be a part of a manifold, attached to a manifold, etc. As shown, the valve seat 430 includes a base portion 432 and a wall portion 434 that extends axially away from the base portion 432 (e.g., as a pipe, cylindrical wall, etc.). Where the base portion 432 and the wall portion 434 include substantially circular cross-sections, the base portion 432 can include an outer diameter that exceeds an outer diameter of the wall portion 434. An exhaust passage is defined by an inner surface of the valve seat 430, which may be a substantially cylindrical surface.

In the example assembly 400 of FIG. 4, the housing 410 includes a recess 413 that extends axially inwardly from a face 416 of the housing 410 (e.g., optionally including one or more shoulders, etc.) and that can receive the valve seat 430. In the example assembly 400 of FIG. 4, the valve seat 430 includes a surface 436 and a surface 438, which is disposed at an angle, for example, defined relative to the surface 436, a planar surface of the component 450, the face 416 of the housing 410, etc., upon which the poppet 420 may be seated when the poppet 420 is in a closed state. Such an angle (e.g., a swing angle) may reduce a rotational angle when moving the poppet 420 between an open state and a closed state. As an example, a valve seat may include a surface to seat a poppet where the surface is disposed in an assembly at an angle of about zero degrees. For example, consider the valve seat 430 as having the surface 438 being parallel to the surface 436, which may result in a greater travel distance (e.g., angle of rotation) for the arm 422 to seat the poppet 420 against the surface 438. In such an example, a lower surface of the poppet 420 may be about parallel to the interface between the housing 410 and the component 450 (e.g., and about parallel to a plane of a gasket or gaskets disposed between the housing 410 and the component 450). As an example, an angle may be considered in a force diagram, for example, to consider force applied to a valve seat by a poppet and balance of that force (e.g., as to one or more components that are in directly or indirectly in contact with the valve seat).

FIG. 4 also shows a perspective view of an assembly 500 that includes a housing 510, a valve seat 530, a gasket 560 and a gasket 570. In the example of FIG. 4, the housing 510 includes an exhaust inlet flange 511 configured for connection to another component for receipt of exhaust and a housing flange 518 for operatively coupling the housing 510 to, for example, a center housing of a turbocharger. As shown in the example of FIG. 4, the housing flange 518 includes an opening for receipt of a turbine (e.g., a turbine wheel) where, for example, exhaust entering via the exhaust inlet flange 511 may flow to a volute defined by the housing 510 to be directed to the turbine (e.g., and then axially outwardly from the turbine to an exhaust outlet of the housing 510).

In the example of FIG. 4, the housing 510 includes a recess 513, a face 516 and a recess 517 as well as an edge 515 that defines an opening for flow of exhaust (e.g., from an outlet of a high pressure turbine). In the example assembly 500 of FIG. 4, the gasket 560 is seated on the valve seat 530, which is received by the recess 513 of the housing 510, and the gasket 570 is seated in the recess 517 of the housing 510. As an example, the gasket 560 may include a V-shaped cross-section formed by a single piece or multiple pieces where the V-shaped cross-section is open about an inner perimeter and closed about an outer perimeter. As an example, a closed side of a V-shaped cross-section of the gasket 560 may be formed by a joint between two pieces such as an upper piece and a lower piece. As an example, the joint may be formed upon application of clamping force (e.g., by joining two components with the two pieces of the gasket therebetween) or, for example, the joint may be formed by welding or other process to join two pieces (e.g., in a manner where a seal is formed therebetween).

As an example, the gasket 570 may include a C-shaped cross-section that is open about an inner perimeter and closed about an outer perimeter. As an example, where a gasket includes such a C-shaped cross-section and an approximately circular perimeter, such a gasket may be referred to as a C-ring or, for example, as including a C-ring or C-ring portion. As an example, each of the gasket 560 and the gasket 570 may include an open portion (e.g., in cross-section) along a portion that faces one or more exhaust sources (e.g., exhaust from a manifold and/or from an outlet of a high pressure turbine). Each of the gaskets 560 and 570 may be provided to seal interfaces between two or more components.

As described herein, interfaces exist between various items, which are intended to be permanent or temporary and reproducible. For example, interface seals associated with the gaskets 560 and 570 are intended to be permanent (e.g., unless disassembly is desired); whereas, the interface seal between a poppet and a valve seat is intended to be temporary and reproducible. Specifically, the seal exists when the exhaust valve is in a closed position and, after opening of the valve and reclosing, the interface seal can be reproduced (e.g., to help ensure consistent control and operation over lifetime of a system).

As shown in FIG. 4, the gaskets 560 and 570 may be provided for sealing interfaces between components (e.g., intended permanent seals). One or more of the gaskets 560 and 570 may be a multi-layer metal sheet gasket. As an example, if a change in shape of the valve seat 530 occurs, an interface seal between the valve seat 530 and a poppet, the valve seat 530 and the gasket 560 and the recess 513 may be stressed. Accordingly, changes in the valve seat 530 can have a detrimental impact on the gasket 560, which may lead to exhaust leakage from a high pressure path. As described herein, changes in sealing ability over time can be quite detrimental to controllability and operability of a system that includes turbochargers. In the example assembly 500 of FIG. 4, the gasket 560 and the gasket 570 may be shaped to accommodate changes that may occur with respect to components (e.g., such as the valve seat 530) to help maintain sealing ability.

Figure 5:
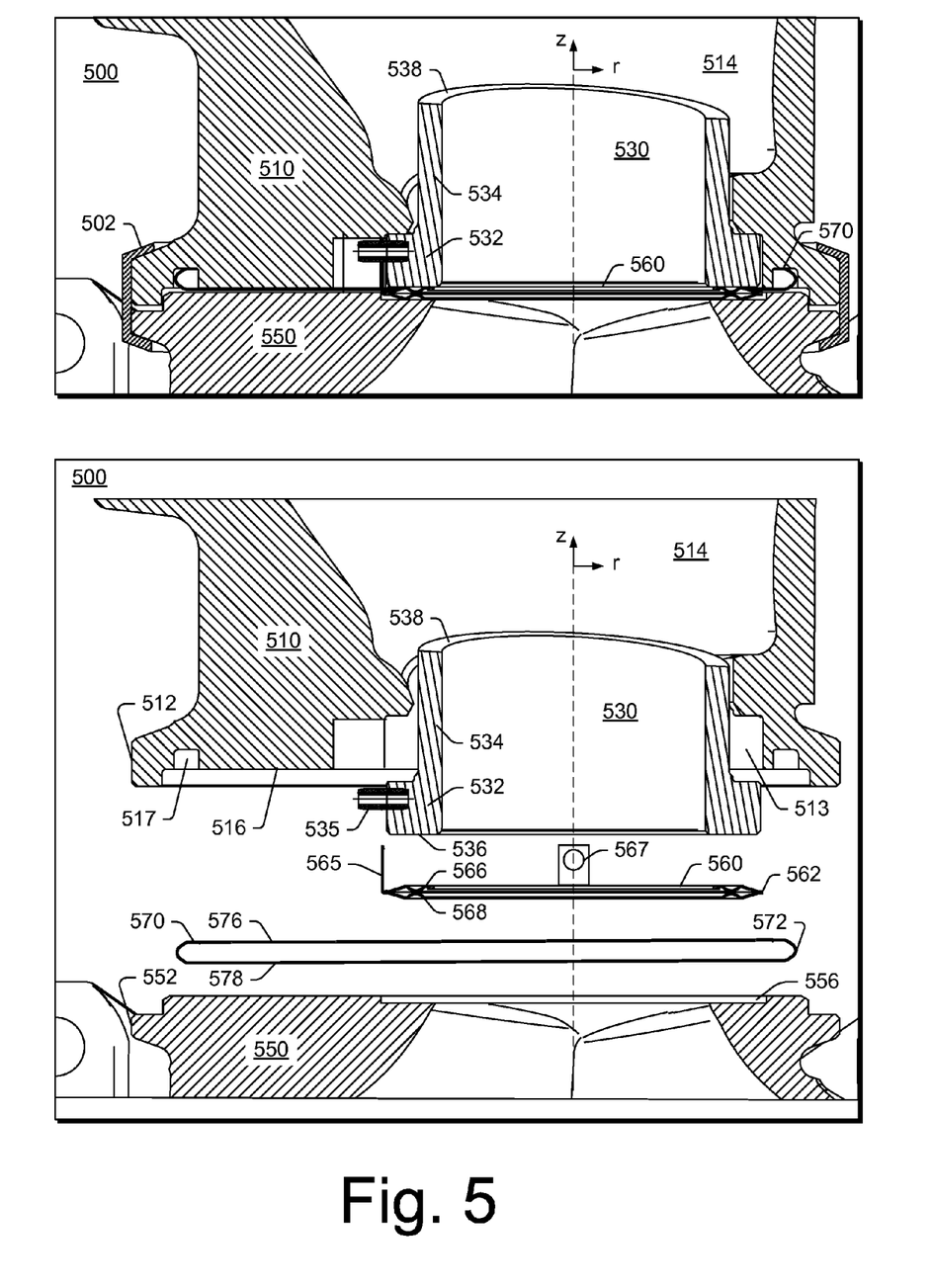
FIG. 5 is a cross-sectional view and an exploded cross-sectional view of an assembly.

FIG. 5 shows a portion of the example assembly 500 in an assembled cross-sectional view and in an exploded cross-sectional view with respect to a component 550, which may be a part of a manifold, attached to a manifold, etc., and a V-band 502, for example, to securely join the housing 510 and the component 550 about respective edges 512 and 552. As an example, a V-band may be provided as an alternative to bolts, studs, etc., or, for example, in addition to one or more bolts, studs, etc.

As shown, the housing 510 includes the recess 513 and also defines a chamber 514 into which the valve seat 530 extends (e.g., optionally to be flush with an axial face of the housing 510, wholly within the housing 510, etc.). In the example of FIG. 5, the valve seat 530 includes a base portion 532 and a wall portion 534 that extends axially away from the base portion 532 to an angled surface 538 upon which a poppet (e.g., a plug) may be seated (e.g., noting that a valve seat may have a different angle, including an angle of about zero degrees). As shown, the valve seat 530 also includes at least one peg 535 that, for example, extends radially outwardly from the base portion 532 (e.g., at an axial location above a lower surface or face 536 of the base portion 532).

In the example of FIG. 5, the gasket 560 is shown as including a perimeter 562, for example, at or near a junction between an upper surface 566 and a lower surface 568. In the example of FIG. 5, the gasket 560 also includes at least one tab 565, which may, for example, include an opening 567 for receipt of a corresponding peg of the valve seat 530 (see, e.g., the peg 535).

In the example of FIG. 5, the gasket 570 is shown as including a perimeter 572, for example, at or near a junction between an upper surface 576 and a lower surface 578.

As shown, upon assembly (e.g., in an assembled state), the gasket 560 is seated on the valve seat 530 and the gasket 560 disposed at least in part between the lower surface 536 of the valve seat and a surface 558 of a recess 556 of the component 550, which may be a recessed surface. As an example, the valve seat 530 may not extend into a recess of the component 550 (e.g., noting that a portion of the gasket 560 may extend into the recess 556). As an example, the valve seat 530 with the gasket 560 mounted thereto (e.g., via one or more tabs, etc.) may be disposed within the housing 510 where, for example, when coupled to the component 550, the gasket 560 and valve seat 530 may not extend past a lowermost surface of the housing 510. For example, consider a lower annular surface of the flange 511 of the housing 510 that is received in an annular shouldered portion of the component 550, for example, to help locate the housing 510 with respect to the component 550 (e.g., to help maintain clearances, etc.) where, upon locating, a V-band or other mechanism may be used to apply a clamping force to clamp the housing 510 to the component 550.

As shown in the example of FIG. 5, the gasket 560 may form an inner seal while the gasket 570 may form an outer seal where, for example, the inner seal and the outer seal may be referred to as concentric seals (e.g., noting that that may not share a common axis or center point). In the example of FIG. 5, the gasket 560 may be referred to as an inner gasket while the gasket 570 may be referred to as an outer gasket (e.g., as concentric gaskets).

As an example, the gasket 560 may have a stiffness that aims to ensure a seat maintaining function (e.g., as part of a sealing function) when disposed between components, for example, when subject to axial force (e.g., consider a clamping force applied to clamp components). For example, the gasket 560 may have a stiffness and configuration to accommodate a force of about 8 kN (e.g., resistance offered by a gasket to elastic deformation). As an example, the gasket 570 may have a stiffness that aims to ensure a sealing function. For example, the gasket 570 may have a stiffness and configuration to accommodate a force of about 2 kN. As an example, stiffness of the gasket 560 and the gasket 570 may counteract force applied by a V-band or other distributed connection mechanism that connects the housing 510 and the component 550. A distributed connection mechanism may distribute force in a substantially even manner about an edge of a component, for example, in comparison to bolts. For example, where about four bolts (e.g., or studs) are used to connect a housing to another component, each bolt may apply a force of about 20 kN for a total force of about 80 kN (e.g., for a 4 bolt flange). As an example, a V-band (e.g., a distributed connection mechanism) may effectively couple two components with a lesser total force. As an example, where four bolts provide a total force of about 80 kN, a V-band may provide a lesser total force, for example, of about 15 kN to about 20 kN. In such an example, the gasket 570 may be a C-ring and, for example, have a stiffness and configuration to accommodate a force of about 2 kN (e.g., or less) and the gasket 560 may include a V-shaped cross-section with a stiffness and configuration to accommodate a force of about 8 kN, for example, for a total accommodated force of about 10 kN (e.g., or less).

As an example, the valve seat 530 may be "loaded" in the assembled state where loading force may be determined, for example, by a combination of gasket stiffness(es) and clamping force(s). In such an example, loading may improve sealing of interfaces for various operational conditions, cycling, etc. As an example, management of forces may reduce one or more of leakage risk (internal/external), risk of performance loss at low engine RPM, risk seat failure, risk of noise, etc. As an example, internal leakage through a valve can result in lost power for a high pressure turbine (e.g., high pressure turbocharger) while external leakage can result in lost power, increased emissions, detrimental temperature increases in a local external environment, etc.

As examples, a valve seat, a gasket or both a valve seat and a gasket may be constructed from an austenitic nickel-chromium-based superalloy (e.g., INCONEL® family of alloys, Special Metals Corporation, New Hartford, N.Y.). In the example of FIG. 5, the valve seat 530, the gasket 560 and/or the gasket 570 may be made of material that includes nickel and chromium (e.g., greater than about 40% Ni and greater than about 10% Cr).

As an example, a gasket may be constructed from a process such as stamping. For example, given a sheet of alloy, a stamping process (e.g., using one or more dies) may form perimeters, openings and contours of a gasket or a piece of a gasket (e.g., consider a gasket formed by two or more stamped sheets, etc.).

As an example, a valve seat and a gasket may be joined prior to attachment of components to be sealed. For example, the gasket 560 may be joined to the valve seat 530 and then stored as a single part. Upon assembly of a turbocharger system, the part can be retrieved and positioned prior to clamping the part between two components (e.g., via a V-band). In such an example, the valve seat can add integrity to the gasket, which may reduce risk of deformation prior to installation or at time of installation. When provided as a single part, assembly time for a turbocharger system may be reduced.

As an example, the gasket 570 may include a perimeter dimension that allows for an interference fit (e.g., a press fit), for example, such that the gasket 570 may be securely fit into the recess 517 of the housing 510. In such an example, the housing 510 may be stored as a subassembly that includes the gasket 570.

Figure 6:
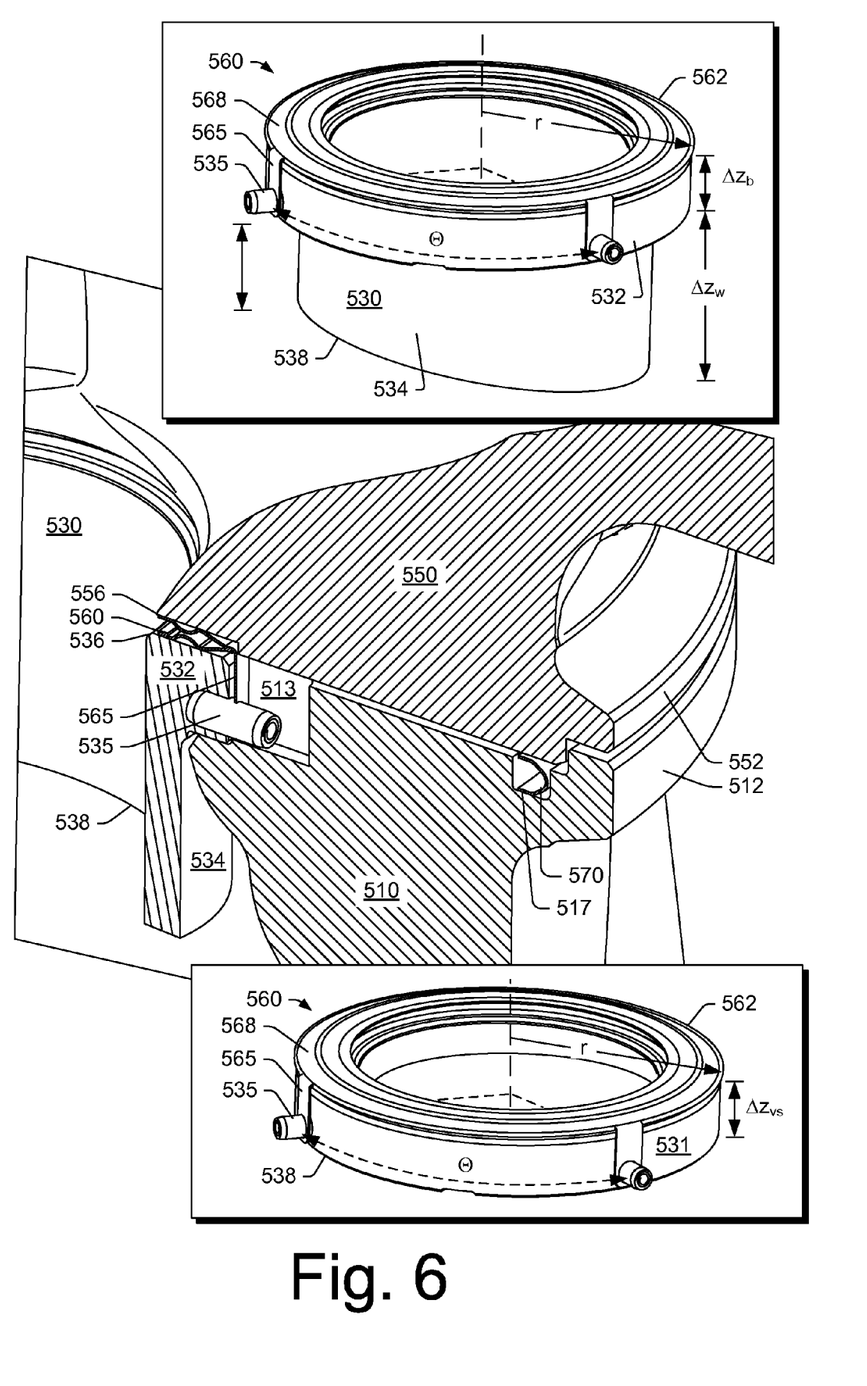
FIG. 6 is a perspective view of an example of a valve seat and a cross-sectional view of the assembly of FIG. 5 that includes the valve seat and a perspective view of another example of a valve seat.

FIG. 6 shows a perspective view of the valve seat 530 and a cross-sectional view of a portion of the assembly 500 of FIG. 5. As shown in FIG. 6, the valve seat 530 can include a plurality of individual pegs 535. For example, the valve seat 530 can include two pegs spaced by an angle $\Theta$ about the base portion 532. The gasket 560 may include a plurality of individual tabs 565 that are configured to engage individual corresponding pegs 535, for example, to secure the gasket 560 to the valve seat 530.

In the example of FIG. 6, the valve seat 530 is shown as including various dimensions, for example, along a z-axis (see, e.g., $\Delta z_b$ and $\Delta z_w$). As mentioned, the surface 538 of the valve seat 530 may be disposed at an angle, for example, with respect to the surface 536 of the valve seat 530.

FIG. 6 also shows a perspective view of another example of a valve seat 531, which includes various dimensions including a valve seat axial height ($\Delta z_{vs}$). In this example, the surfaces 536 and 538 are approximately parallel. As an example, the surface 538 may be disposed at an angle, for example, where the valve seat 531 has a relatively constant outer diameter. As shown, the valve seat 531 may include pegs 535, for example, to secure the gasket 560 to the valve seat 531.

Figure 7:
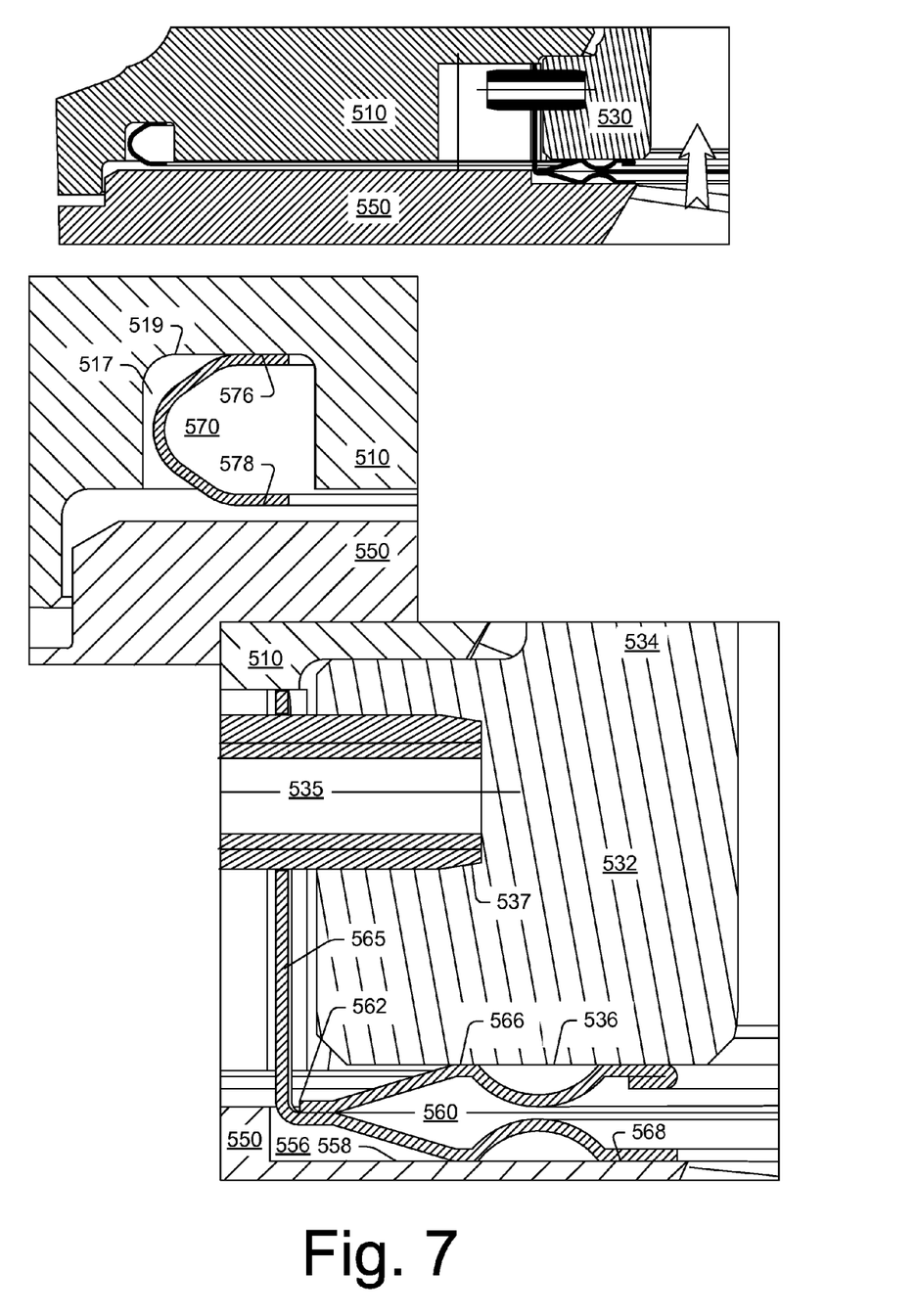
FIG. 7 is a series of cross-sectional views of an example of a V-shaped gasket and an example of a gasket that includes a C-ring (e.g., a C-ring gasket)

FIG. 7 shows a series of cross-sectional views of an example of the gasket 560 as including a V-shape gasket and an example of the gasket 570 as including a C-ring. As shown, the housing 510 can include an upper surface 519 in the recess 517 that abuts the upper surface 576 of the gasket 570 (e.g., at the C-ring portion) and the component 550 can include the lower surface 558 in the recess 556 that abuts the lower surface 568 of the gasket 560. In FIG. 7, a mid-line of the gasket 570 is shown as being at a higher axial position than a mid-line of the gasket 560 (e.g., not including the tab 565). In such an arrangement, the mid-line offset may be dependent on one or more parameters, for example, including recess depths, axial heights of the gaskets, etc. For example, the recess 556 of the component 550 can provide for axially offsetting the mid-line of the gasket 560 to an axial location below the mid-line of the gasket 570.

FIG. 7 also shows the valve seat 530 as including a peg bore 537 for receipt of the peg 535. As shown, the peg bore 537 extends a radial distance into the base portion 532 of the valve seat 530 (e.g., sufficient to secure a peg therein). As an example, a peg may be received in a peg bore where the peg provides for one or more functions. For example, the peg may provide for positioning and/or securing a gasket to a valve seat. As another example, a peg may provide for positioning a valve seat with respect to a housing. As mentioned, a valve seat may include one or more pegs, for example, where each peg may provide one or more functions.

Figure 8:
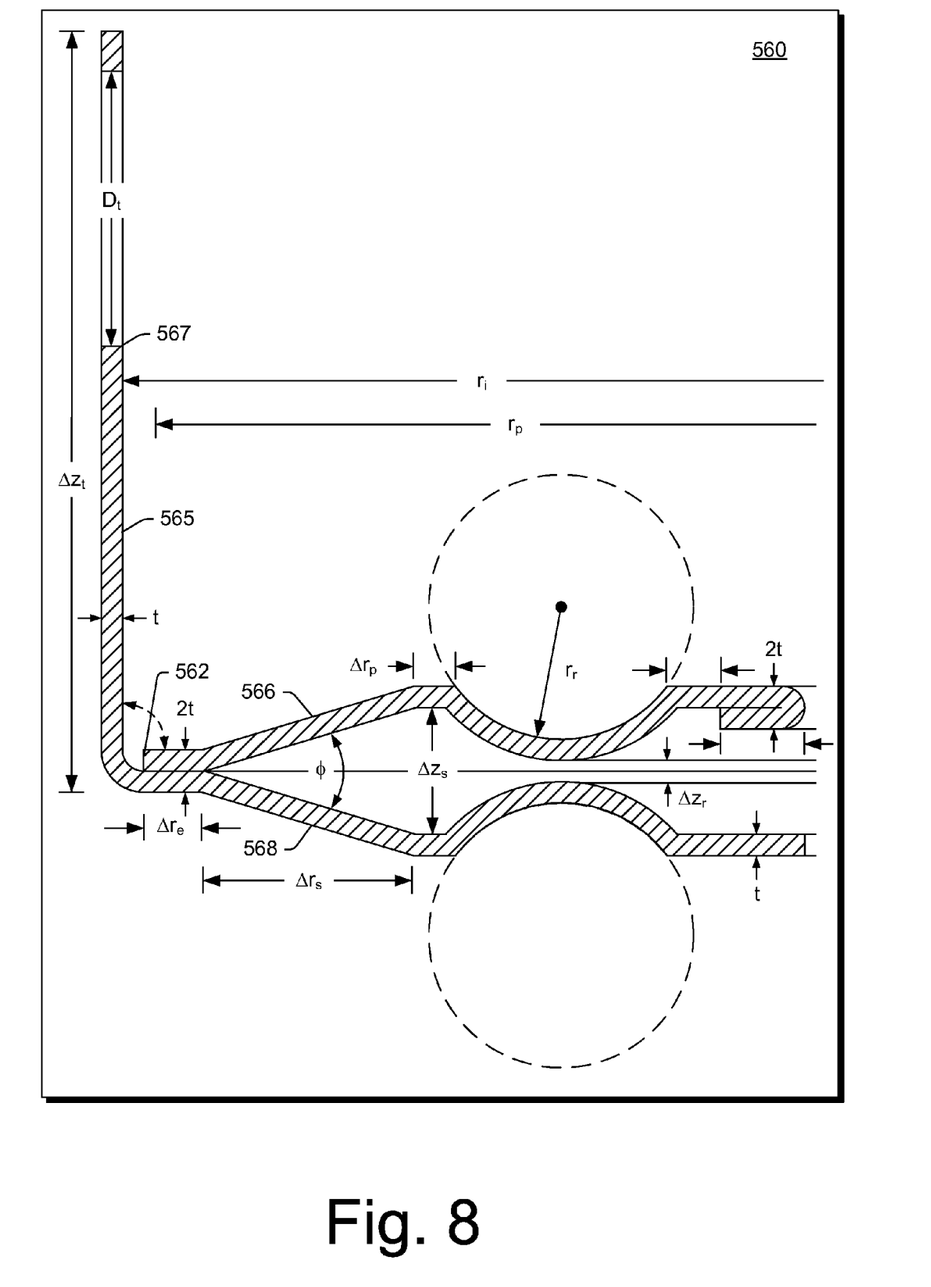
FIG. 8 is a cross-sectional view of an example of the V-shaped gasket of FIG. 7.

FIG. 8 shows a cross-sectional view of an example of a portion of the gasket 560 as including a V-shape. In the example of FIG. 8, the gasket 560 may be formed from an upper piece and a lower piece where the upper piece has an annular shape with a folded end that defines an inner perimeter and that, at an outer edge, joins a planar portion of the lower piece to define an outer perimeter. At that junction, a closed side of a V-shape is formed while an inner edge of the lower piece and the folded end of the upper piece form an open side of the V-shape. Between the open side and closed side, the gasket 560 may include a cavity that responds to increase pressure by forcing sloped portions of the V-shape outwardly, for example, to enhance sealing. In the example of FIG. 8, the V-shape may be defined by a free angle φ, which may change upon assembly, responsive to operational conditions, etc. As an example, the upper piece and the lower piece may include a thickness t or, for example, may include different thicknesses (e.g., optionally creating a stopper).

As shown in the example of FIG. 8, the lower piece includes the tab 565 as an extension from the outer perimeter that extends axially upward. Alternatively, or additionally, the upper piece may include one or more tabs. As an example, a tab may be oriented horizontally, oriented vertically or include a horizontally oriented portion and a vertically oriented portion (see, e.g., FIG. 9). As an example, a tab may be elastically deformable to fit over a peg, etc. As an example, a peg may be a separable component of a valve seat, for example, to allow positioning of the gasket 560 with respect to the valve seat 530 and then insertion of one or more pegs into peg bores of the valve seat 530 to secure the gasket 560 to the valve seat 530. As an example, a peg or pegs may provide for properly positioning of a valve seat in a recess of a housing. In such a manner, a peg or pegs may provide for multiple functions: securing a gasket to a valve seat and positioning a valve seat with respect to a housing.

As an example, the upper piece and the lower piece of the gasket 560 can include annular recesses, which may be defined by a radius or radii. Such an approach may act to limit axial deflection (e.g., compression) of the gasket 560 (see, e.g., a recess gap $\Delta z_r$) and, for example, act to maintain a seating surface for the valve seat 530. As an example, a seating surface of a gasket may be subject to force transmitted by a valve seat upon contact between a poppet and the valve seat. In such an example, a gasket such as the gasket 560 may provide stiffness to accommodate the force while maintaining its sealing function (e.g., when the poppet is in a closed state with respect to the valve seat). As an example, one or more recesses may be provided to manage expansion and contraction, for example, responsive to temperature (e.g., temperature cycling), responsive to application of force, etc.

Figure 9:
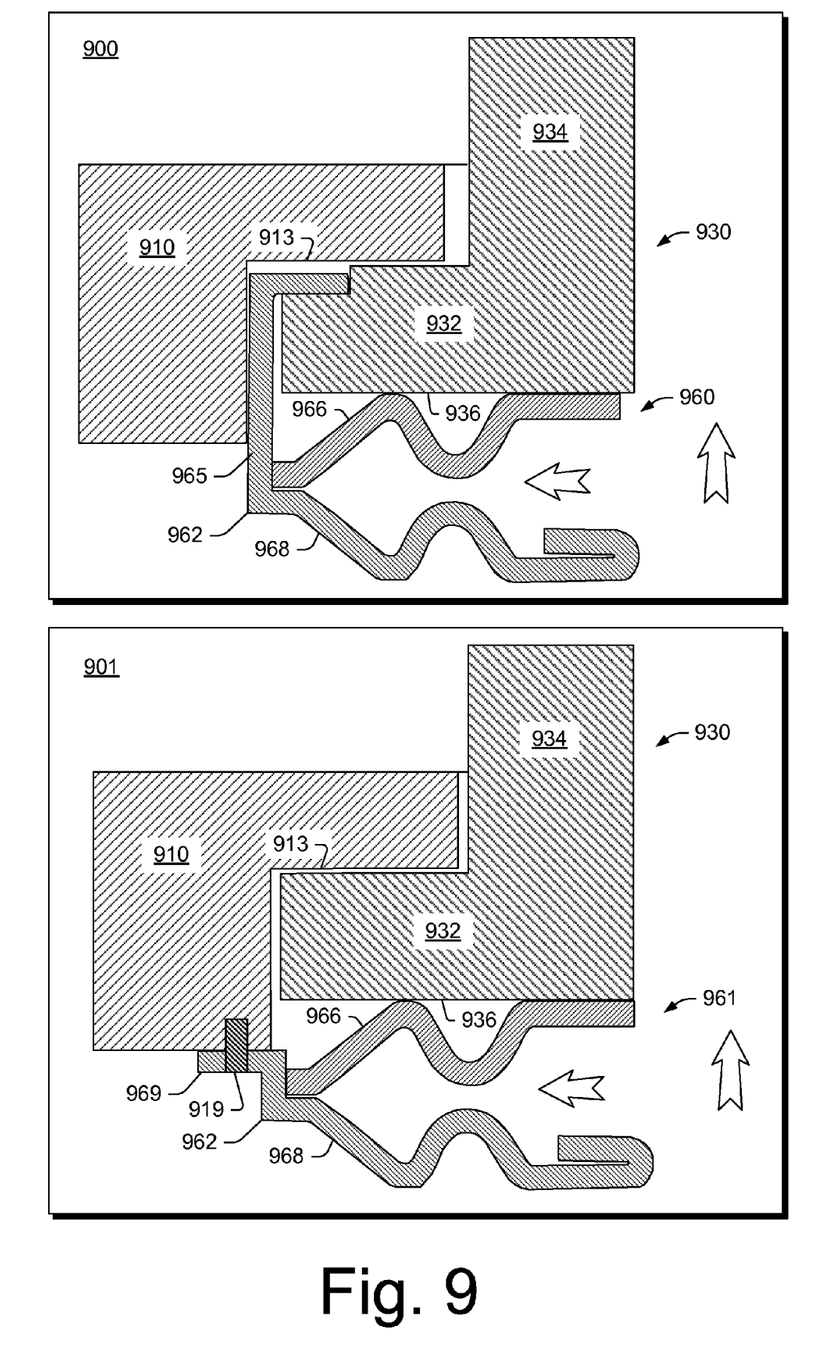
FIG. 9 is a series of cross-sectional views of examples of assemblies that include examples of V-shaped gaskets.

FIG. 9 shows a series of cross-sectional views of examples of assemblies 900 and 901 that include examples of V-shaped gaskets 960 and 961, respectively. As shown, the assembly 900 includes a housing 910, a valve seat 930 and the gasket 960 where the gasket 960 includes a tab 965 that extends axially and radially between surfaces of the housing 910 and the valve seat 930. In particular, a portion of the tab 965 is received in a recess 913 of the housing 910 with respect to a notch in a base portion 932 of the valve seat 930 (e.g., which may optionally allow for some translation of the tab 965 upon assembly); noting that a wall portion 934 extends axially outwardly from the base portion 932. As shown, the gasket 960 may be formed from an upper piece and a lower piece and include an upper surface 966 that abuts a surface 936 of the valve seat 930 and a lower surface 968 that extends to an outer perimeter 962 from which the tab 965 extends axially upwardly. In such an arrangement, the upper piece may be inserted into the lower piece, for example, as an outer diameter of the upper piece may be greater than an inner dimension of the radially inwardly directed end of the tab 965. In such an example, the two pieces may be "loose" and fit together by compression (e.g., upon securing the housing 910 to another component).

As shown in FIG. 9, the assembly 901 includes a peg 919 in the housing 910, which may act to locate and/or secure the gasket 961. As shown, the gasket 961 includes a radially outwardly directed tab portion 969 that includes an opening for receipt of the tab 919.

Figure 10:
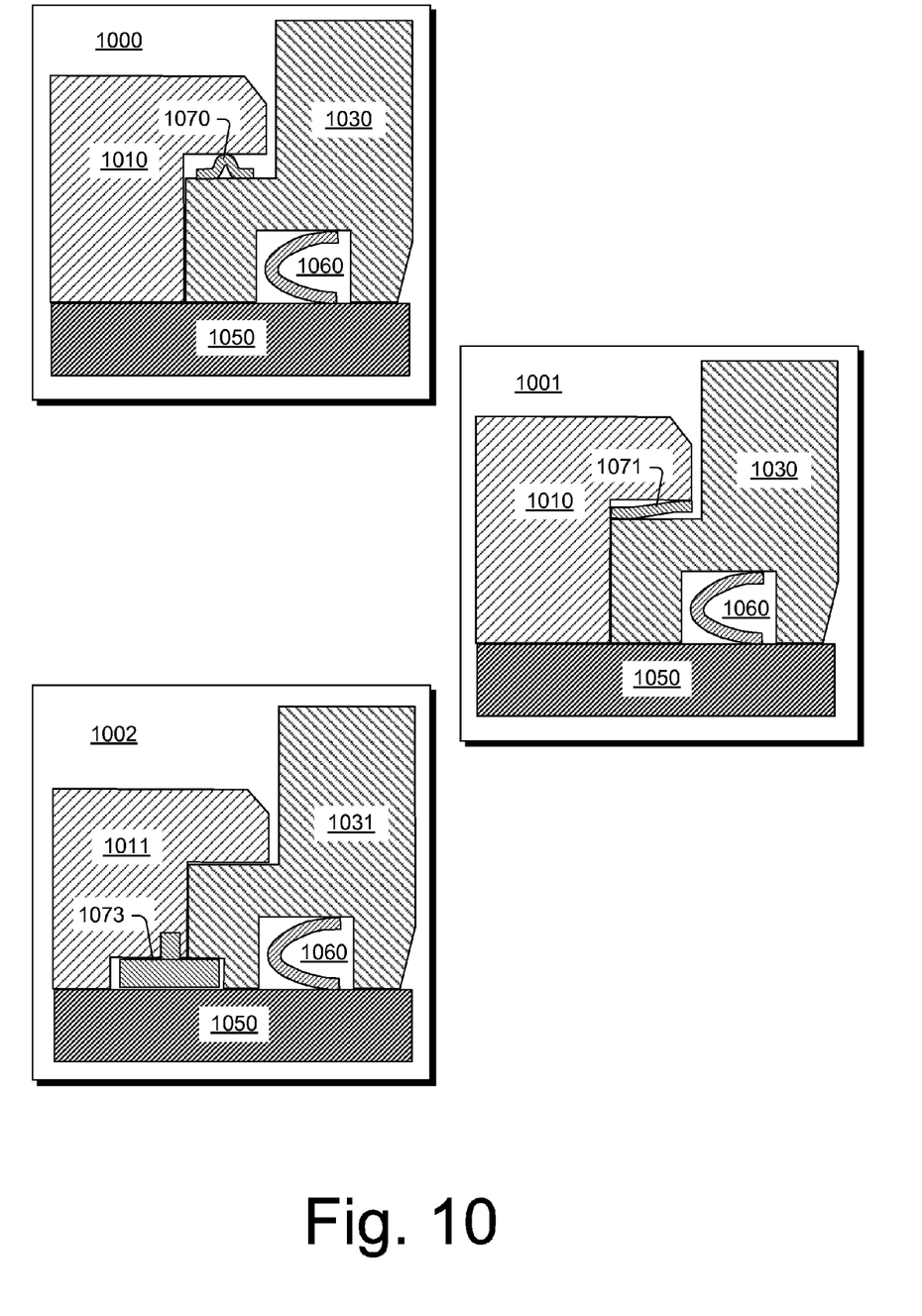
FIG. 10 is a series of cross-sectional views of examples of assemblies that include examples of seal mechanisms.

FIG. 10 is a series of cross-sectional views of examples of assemblies 1000, 1001 and 1002 that include examples of seal mechanisms. The assembly 1000 includes a housing 101, a valve seat 1030 and a component 1050 where a C-ring gasket 1060 and a ridged gasket 1070 act to seal interfaces between the valve seat 1030 and the component 1050 and between the valve seat 1030 and the housing 1010, respectively. As shown in FIG. 10, the assembly 1001 includes the C-ring gasket 1060 and a washer gasket 1071, which may be, for example, a Belleville washer. As to the assembly 1002, it includes a housing 1011 with a socket to receive a bolt 1073 that can bolt a valve seat 1031 to the housing 1011. In such an arrangement, force may be applied to seal an interface between the valve seat 1031 and the housing 1011 as well as, for example, to locate the valve seat 1031 with respect to the housing 1011.

Figure 11:
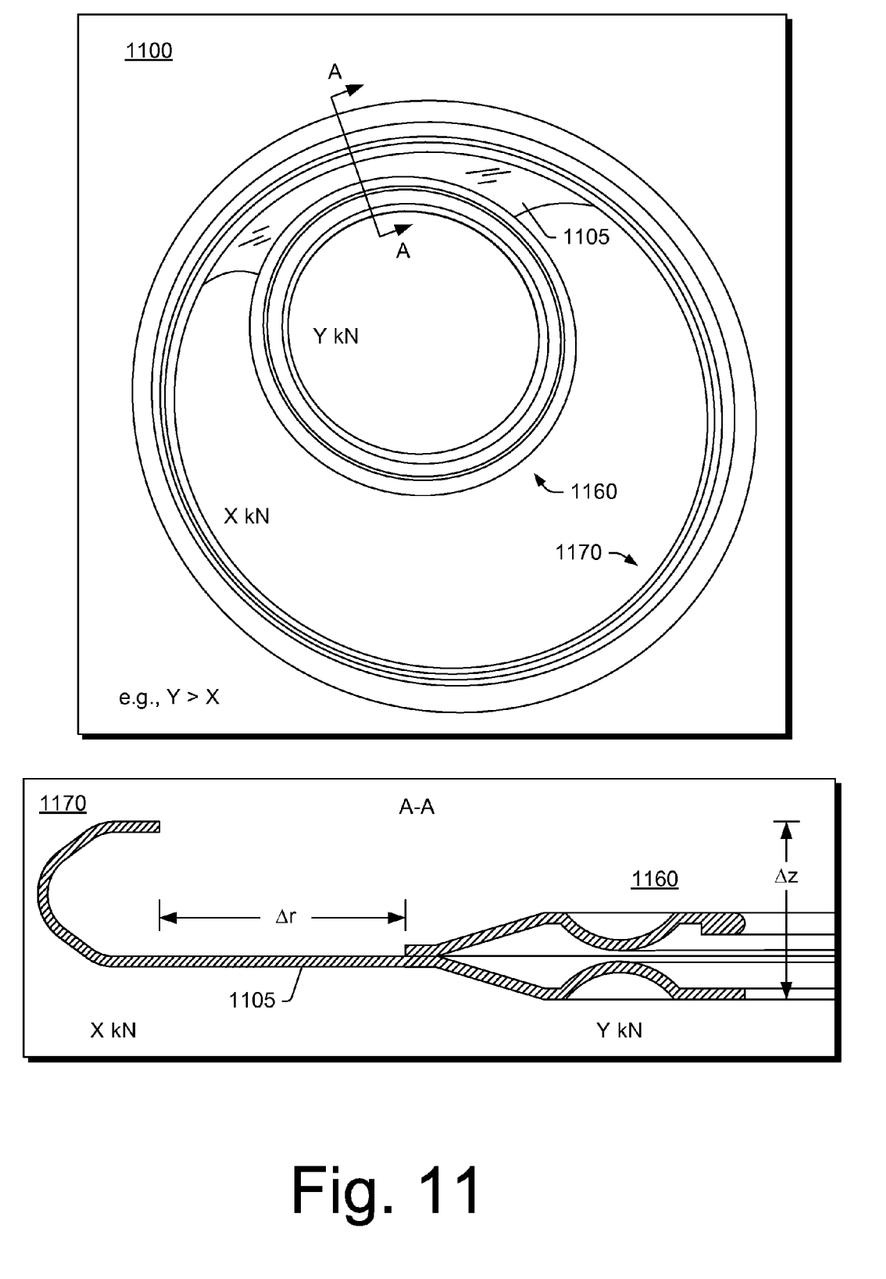
FIG. 11 is a perspective view of an example of a gasket and cross-sectional views of portions of the gasket.

FIG. 11 shows a perspective view of an example of a gasket 1100 and a cross-sectional view of a portion of the gasket 1100 along line A-A. In the example of FIG. 11, the gasket 1100 includes an inner gasket 1160 that is joined to an outer gasket 1170 via a bridge 1105 (e.g., which may be substantially planar). As an example, a unitary piece may form the bridge 1105, the outer gasket 1170 and a portion of the inner gasket 1160. In such an example, the unitary piece may be stamped from a sheet of material (e.g., metal, alloy, etc.) and another piece may be stamped from a sheet of material (e.g., metal, alloy, etc.) where the other piece is joined to the unitary piece to form the inner gasket 1160. As shown in the cross-section along the line A-A, the inner gasket 1160 may include a V-shaped cross-section and the outer gasket 1170 may include a C-shaped cross-section (e.g., a C-ring portion). As an example, stiffness of the V-shape of the inner gasket 1160 and stiffness of the C-ring portion of the outer gasket 1170 may differ, for example, where the inner gasket 1160 has a greater stiffness than that outer gasket 1170. As an example, the gasket 1100 may be secured between two components using a distributed connection mechanism such as, for example, a V-band (see, e.g., the V-band 502 of FIG. 5). In such an example, the distributed connection mechanism may connect the two components along beveled surfaces (e.g., chamfers) to apply an axially directed force that clamps the components, for example, consider an axially directed clamping force where the gasket 1100 is subject to such force as being disposed between the components. As an example, the gasket 1100 may include one or more tabs, for example, extending from the inner gasket 1160 to engage another component such as a housing, a valve seat, etc. (see, e.g., FIGS. 5 and 9). As an example, the inner gasket 1160 may include a closed side of a V-shaped portion formed by a joint between an upper piece and a lower piece (e.g., where one of the pieces may extend outward to form the bridge 1105 that joins the outer gasket 1170.

An assembly can include a valve seat for an exhaust bypass valve of a serial turbocharger system where the valve seat may include a base portion and a wall portion that extends axially away from the base portion; and a gasket that includes a planar portion that defines a perimeter and that includes a tab that extends from the perimeter of the planar portion for engagement with the valve seat to secure the gasket to the valve seat. In such an example, the valve seat may include a peg where the tab may engage the peg. As an example, a peg may be provided that extends radially outwardly from a base portion of the valve seat and where a tab extends axially upwardly from a planar portion of a gasket and includes an opening to receive the peg.

As an example, an assembly can include a valve seat with a shoulder between a base portion and a wall portion (e.g., defined by a transition between the base and wall portions) where a tab of a gasket includes an axially directed portion and a radially directed portion and where the radially directed portion of the tab engages the shoulder to secure the gasket to the valve seat.

As an example, a gasket can include a V-shaped cross-section that includes an open side that faces radially inwardly from a perimeter of the gasket. As an example, a gasket may have a stiffness that accommodates a force of about 8 kN (e.g., consider an axially applied force).

As an example, a gasket may include an upper piece and a lower piece, for example, where the upper piece includes a recessed portion, where the lower piece includes a recessed portion and where the recessed portions define an axial deflection gap for axial deflection between the upper piece and the lower piece (e.g., where surfaces may contact to limit further deflection). In such an example, the recessed portions may be arcuate (e.g., semi-circular) in their cross-sections where responsive to applied force, the recessed portions contact along a line (e.g., a circular contact line).

As an example, an assembly for a serial sequential turbocharger system can include a housing that defines an exhaust chamber and that includes a recess; an exhaust bypass valve disposed at least partially in the exhaust chamber where the exhaust bypass valve includes an arm and a poppet; a gasket that includes a V-shaped cross-section; a valve seat disposed at least partially in the recess of the housing where the valve seat may include a base portion and a wall portion that extends from the base portion, where the valve seat includes an upper surface for seating the poppet of the exhaust bypass valve and a lower surface for seating the gasket; and a component coupled to the housing where the component includes an exhaust passage and where the gasket is disposed between the component and the housing to position the valve seat with respect to the poppet for an orientation of the exhaust bypass valve that seals the exhaust chamber from the exhaust passage. In such an example, the housing may include a passage to direct exhaust from the exhaust chamber to an inlet of a volute (see, e.g., FIGS. 1, 2, 3 and 4), for example, where the housing optionally defines the volute. Such a volute (e.g., or scroll) may receive exhaust and direct it to a turbine (e.g., a turbine wheel), optionally via a variable geometry unit, which may include, for example, adjustable vanes that define exhaust flow nozzles. As an example, a component can include a recess configured to accommodate a portion of gasket (see, e.g., the recess 556 of the component 550). As an example, a housing and a component may be coupled using a V-band. In such an example, the V-band may couple the housing to the component with a force of at least approximately 15 kN.

As an example, an assembly can include a gasket with an outer perimeter and another gasket with an inner perimeter that exceeds the outer perimeter of the gasket. In such an example, the other gasket may include or be a C-ring. As an example, two gaskets may be formed as a unitary piece (e.g., where one gasket portion bounds another gasket portion of the unitary piece).

As an example, a valve seat may include a peg that extends radially outwardly from a base portion of the valve seat, for example, where the base portion is received by a recess of a housing to orient the valve seat with respect to the housing. In such an example, the gasket can include a tab configured to engage the peg to secure the gasket to the valve seat.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. An assembly comprising:
an exhaust gas bypass valve for a serial turbocharger system that receives exhaust gas from an internal combustion engine wherein the exhaust gas bypass valve comprises a valve seat that comprises a peg; and
a gasket that comprises a planar portion that defines a perimeter and that comprises a tab that extends from the perimeter of the planar portion for engagement with the peg of the valve seat to secure the gasket to the valve seat, wherein the gasket comprises a V-shaped cross-section that comprises an open side that faces radially inwardly from the perimeter.

2. The assembly of claim 1 wherein the valve seat comprises a base portion and a wall portion that extends axially away from the base portion.

3. The assembly of claim 2 wherein the valve seat comprises a shoulder between the base portion and the wall portion, wherein the tab comprises an axially directed portion and a radially directed portion and wherein the radially directed portion of the tab engages the shoulder to secure the gasket to the valve seat.

4. The assembly of claim 1 wherein the peg extends radially outwardly from a base portion of the valve seat and wherein the tab extends axially upwardly from the planar portion of the gasket and comprises an opening to receive the peg.

5. The assembly of claim 1 wherein the gasket comprises a stiffness that accommodates a force of about 8 kN.

6. The assembly of claim 1 wherein the gasket comprises an upper piece and a lower piece.

7. The assembly of claim 6 wherein the upper piece of the gasket comprises a recessed portion, wherein the lower piece of the gasket comprises a recessed portion and wherein the recessed portions define an axial deflection gap for axial deflection between the upper piece and the lower piece.

8. The assembly of claim 7 wherein the recessed portion of the upper piece of the gasket is defined at least in part by a radius, wherein the recessed portion of the lower piece of the gasket is defined at least in part by a radius or wherein the recessed portion of the upper piece of the gasket is defined at least in part by a radius and wherein the recessed portion of the lower piece of the gasket is defined at least in part by a radius.

9. An assembly for a serial sequential turbocharger system that receives exhaust gas from an internal combustion engine, the assembly comprising:
   a housing that defines an exhaust gas chamber and that comprises a recess;
   an exhaust gas bypass valve disposed at least partially in the exhaust gas chamber wherein the exhaust gas bypass valve comprises an arm and a poppet;
   a gasket that comprises a V-shaped cross-section;
   a valve seat disposed at least partially in the recess of the housing wherein the valve seat comprises an upper surface for seating the poppet of the exhaust gas bypass valve, a lower surface for seating the gasket, and a peg that extends radially outwardly from a base portion of the valve seat that is received by the recess of the housing to orient the valve seat with respect to the housing; and
   a component coupled to the housing wherein the component comprises an exhaust gas passage and wherein the gasket is disposed between the component and the housing to position the valve seat with respect to the poppet for an orientation of the exhaust gas bypass valve that seals the exhaust gas chamber from the exhaust gas passage.

10. The assembly of claim 9 wherein the housing that defines the exhaust gas chamber comprises a passage to direct exhaust gas from the exhaust gas chamber to an inlet of a volute.

11. The assembly of claim 10 wherein the housing that defines the exhaust gas chamber defines the volute.

12. The assembly of claim 9 wherein the component comprises a recess configured to accommodate a portion of the gasket.

13. The assembly of claim 9 further comprising a V-band wherein the housing that defines the exhaust gas chamber is coupled to the component by the V-band.

14. The assembly of claim 13 wherein the V-band couples the housing that defines the exhaust gas chamber to the component with a force of at least approximately 15 kN.

15. The assembly of claim 9 wherein the gasket comprises an outer perimeter and further comprising another gasket that comprises an inner perimeter that exceeds the outer perimeter of the gasket.

16. The assembly of claim 15 wherein the other gasket comprises a C-ring.

17. The assembly of claim 15 wherein the gasket and the other gasket are formed in part by a unitary piece.

18. The assembly of claim 9 wherein the gasket comprises a tab configured to engage the peg to secure the gasket to the valve seat.

19. An assembly comprising:
   an exhaust gas bypass valve for a serial turbocharger system that receives exhaust gas from an internal combustion engine wherein the exhaust gas bypass valve comprises a valve seat; and
   a valve seat gasket that contacts the valve seat and that comprises
      an opening for flow of exhaust gas,
      an upper piece that comprises an annular sloped portion that extends to an upper annular planar seating surface that comprises a recess, and
      a lower piece that comprises an annular sloped portion that extends to a lower annular planar seating surface that comprises a recess,
   wherein the upper piece and the lower piece are joined such that the annular sloped portions form a V-shaped cross-section that comprises an open end that faces radially inwardly toward the opening,
   wherein the upper annular planar seating surface and the lower annular planar seating surface define an axial distance, and
   wherein the recesses define an axial gap that is less than the axial distance to limit axial deflection of the open end of the V-shaped cross-section of the valve seat gasket.

20. An assembly for a serial sequential turbocharger system that receives exhaust gas from an internal combustion engine, the assembly comprising:
   a housing that defines an exhaust chamber and that comprises a recess that extends axially away from a face of the housing;
   an exhaust bypass valve disposed at least partially in the exhaust chamber wherein the exhaust bypass valve comprises an arm and a poppet;
   a gasket that extends axially into the recess, that comprises a V-shaped cross-section, and that comprises an open side that faces radially inwardly from a perimeter of the gasket;
   a valve seat disposed at least partially in the recess and wholly within the housing wherein the valve seat comprises an upper surface for seating the poppet of the exhaust bypass valve and a lower surface for seating the gasket wherein the gasket positions the lower surface a distance axially away from the face of the housing and into the recess of the housing; and
   a component coupled to the housing wherein the component comprises an exhaust passage and wherein the gasket is disposed between the component and the housing to position the valve seat with respect to the poppet for an orientation of the exhaust bypass valve that seals the exhaust chamber from the exhaust passage wherein, for the orientation, exhaust pressure applies force via the open side of the gasket to enhance sealing of the gasket.

* * * * *